United States Patent
Sakamoto et al.

(10) Patent No.: US 6,252,367 B1
(45) Date of Patent: Jun. 26, 2001

(54) SERVO CONTROLLER

(75) Inventors: Keiji Sakamoto, Hachioji; Yukio Toyosawa; Kenji Takahashi, both of Kumamoto, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/479,998

(22) Filed: Jan. 10, 2000

(30) Foreign Application Priority Data

Jan. 11, 1999 (JP) .................................................. 11-003757

(51) Int. Cl.$^7$ ...................................................... G05B 11/01
(52) U.S. Cl. .................. 318/560; 318/700; 318/713; 318/807; 318/809; 318/801
(58) Field of Search .................. 318/700, 713, 318/807, 809, 801, 560

(56) References Cited

U.S. PATENT DOCUMENTS

| | | | |
|---|---|---|---|
| 4,492,903 | * 1/1985 | Knight et al. .................. | 318/341 |
| 4,967,128 | * 10/1990 | Sawai et al. .................. | 318/609 |
| 5,038,090 | * 8/1991 | Kawabata et al. ................ | 318/721 |
| 5,309,075 | * 5/1994 | Yokoe et al. .................. | 318/608 |
| 5,362,222 | * 11/1994 | Fiag et al. .................. | 425/145 |
| 5,440,213 | * 8/1995 | Arita et al. .................. | 318/568.11 |
| 5,739,650 | * 4/1998 | Kimura et al. .................. | 318/254 |
| 5,796,228 | * 8/1998 | Kojima et al. .................. | 318/605 |
| 5,898,287 | * 4/1999 | Roberti et al. .................. | 318/605 |
| 6,064,172 | * 5/2000 | Kuznetov .................. | 318/716 |
| 6,097,168 | * 8/2000 | Katoh et al. .................. | 318/568.1 |
| 6,147,470 | * 11/2000 | Ohashi et al. .................. | 318/757 |
| 6,163,130 | * 12/2000 | Neko et al. .................. | 318/806 |

FOREIGN PATENT DOCUMENTS

| | | | |
|---|---|---|---|
| 03169296 | 7/1991 | (JP) | .................. H02P/7/67 |
| 04248391 | 9/1992 | (JP) | .................. H02P/5/46 |
| 06153571 | 5/1994 | (JP) | .................. H02P/5/46 |
| 06351278 | 12/1994 | (JP) | .................. H02P/5/46 |
| 07123766 | 5/1995 | (JP) | .................. H02P/5/46 |
| 09140189 | 5/1997 | (JP) | .................. H02P/7/67 |
| 09191681 | 7/1997 | (JP) | .................. H02P/6/04 |
| 10174480 | 6/1998 | (JP) | .................. H02P/5/46 |

* cited by examiner

*Primary Examiner*—Robert E. Nappi
*Assistant Examiner*—Tyrone Smith
(74) *Attorney, Agent, or Firm*—Staas & Halsey LLP

(57) ABSTRACT

A servo controller capable of controlling motors to be driven in different control modes, such as a synchronous motor and an induction motor, irrespectively of the type of the motor, and also capable of carrying out servo control by using incremental feedback signals. A control section common to individual motors and a control section dedicated to each motor are provided in a servo controller. The common control section is always used, while the dedicated control section is selectively used in accordance with the motor to be driven. Thereby, motors each requiring a different control mode can be controlled by the servo controller of one type. The use of th servo controller of one type can reduce maintenance management and a load on a CNC. Also, the provision of the control section common to individual motors can restrain increases of size, installation area and manufacturing cost of the device.

8 Claims, 11 Drawing Sheets

SERVO CONTROLLER

BACKGROUND OF THE INVENTION

1. Field of the Invention

The present invention relates to a servo controller for controlling an AC servo motor and an AC spindle motor used as a driving source for a machine tool, an industrial machine, a robot and the like which are controlled by a numerical control (NC) device.

2. Description of the Related Art

A machine tool sometimes uses a synchronous motor for a feed axis for positioning and an induction motor for a spindle in combination. Further, in a vertical-type lathe, when a particular table-feed axis is to be driven in a machining mode putting emphasis on power and also in a positioning mode putting emphasis on efficiency, a synchronous motor and an induction motor are sometimes used by being changed over for each mode.

Generally, in driving the synchronous motor, position of the magnetic pole is determined by using an optical absolute position sensor. In driving the induction motor, the absolute position sensor required for the synchronous motor is unnecessary and an incremental position senor for detecting a relative position can sufficiently carry out the control.

As described above, in order to servo-control the motors which require to be driven in different control modes, such as the synchronous motor and the induction motor, it is necessary to use a servo controller dedicated to each motor and a sensor associated with the motor.

For this reason, when providing servo controllers for maintenance and replacement for a machine having both of the synchronous motor and the induction motor, servo controllers each dedicated to the synchronous motor or the induction motor have to be made ready, which raises problems in terms of maintenance management and cost.

When the synchronous motor and the induction motor are used by being changed over, a servo controller has to be provided for each motor, which increases the number of axes controlled by an NC device and causes problems of an increase in installation area and cost.

FIG. 11 is a block diagram showing an arrangement in which a plurality of motors to be driven in a different control mode are controlled by individual servo controllers. In FIG. 11, a first motor (synchronous motor) Ma is controlled by a servo controller 1a for the first motor, and a second motor (induction motor) Mb is controlled by a servo controller 1b for the second motor. The servo controller 1a for the first motor and the servo controller 1b for the second motor each carry out position control and/or velocity control by using signals fed back from the first motor Ma and the second motor Mb, respectively. In this servo control, the induction motor does not require absolute position information in the feedback signals, so that a relative position sensor suffices for the installed sensor. In contrast, the synchronous motor requires absolute position information in the feedback signals, so that an absolute position sensor is needed.

As the absolute position sensor is constituted by optical mechanisms using a glass plate or the like, it has a problem of being easily affected by the operation environment such as vibration and dust. In contrast, as the relative position sensor which generates incremental signals may be a gear-type sensor or the like, it has an advantage of high reliability against vibrations at the time of high-velocity rotation. Also, a through hole is sometimes formed at the center of the motor for cooling etc. In such a case, a through hole can be formed easily at the center of the gear-type sensor.

The servo controller 1a for the first motor and the servo controller 1b for the second motor are supplied with a position command and/or a velocity command from a CNC 2. Also, a PC (programmable controller) 3 operates by a control signal from the CNC 2 for controlling electric circuits 4 for peripheral equipments.

As described above, when servo-controlling the motors having different control modes, such as the synchronous motor and the induction motor by the conventional servo controller, each motor requires a dedicated servo controller to raise problems in terms of maintenance, increase in size and installation area of the devices, cost, load on the CNC, etc.

SUMMARY OF THE INVENTION

An object of the present invention is to provide a servo controller capable of controlling motors of different type which requires different control modes, such as a synchronous motor and an induction motor.

Another object of the present invention is to provide a servo controller capable of carrying out servo control on the motors of different type by using incremental feedback signals.

The servo controller of the present invention includes a control section common to individual motors and control sections dedicated to the individual motors, and the common control section is always used, while the dedicated control section is selectively used in accordance with the motor to be driven, to thereby enable control of the motors having different control modes by a servo controller of one type.

The use of a servo controller of one type can reduce maintenance management and load on a CNC. Also, the provision of the control section common to individual motors can restrain enlargement of size of the device and increase in installation area and cost.

The servo controller of the present invention comprises a common control section for carrying out control common to a plurality of types of motors requiring different control modes, dedicated control sections each for carrying out control dedicated to each type of motors, and a selecting section for selecting a dedicated control section and driving parameters in accordance with the motor to be driven.

The common control section is for carrying out control common to the plurality of types of motors requiring different control modes and always used. Only one common control section is provided for the plurality of types of motors. Each of the dedicated control sections is for carrying out control dedicated to each type of motors and is selectively used as necessary. The dedicated control sections are provided respectively to correspond to each type of motor.

The selecting section selectively connects a power line to the motor to be driven and selects the dedicated control section dedicated to the selected motor to connect the selected dedicated control section to the common control section. Thereby, the common control section and the dedicated control section cooperatively constitute one servo controller suitable for control of the selected motor.

For driving another type of motor, the selecting section switches the power line, selects the dedicated control section and connects the selected dedicated control section to the common control section, thereby constituting another servo controller suitable for control of the newly selected motor.

Thereupon, the plurality of types of motors requiring different control modes can be controlled by one servo controller.

In the servo controller of the present invention, the common control section carries out position control and/or velocity control, and the selecting section may selectively switch the position control and the velocity control in the common control section.

The plurality of types of motors may consist of an induction motor and a synchronous motor, and a first dedicated control section for the induction motor may comprise a magnetic flux current command generator and a slip command generator, and a second dedicated control section for the synchronous motor may comprise a d-axis current command generator to command a d-axis current of zero.

According to the present invention, a sensor for outputting incremental signals may be associated with each of the induction motors and the synchronous motors, and the common control section and the dedicated control section can perform the control using incremental feedback signals from each sensor.

For achieving this function, the dedicated control section is provided with magnetic pole position determining means for moving the magnetic pole position of the synchronous motor to a predetermined position for a preliminary determination, and starting the synchronous motor with the preliminary determined position as the present magnetic pole position.

In order to control the synchronous motor, it is necessary to know the magnetic pole position. In general, the magnetic pole position is determined by absolute position feedback signals from an absolute-type sensor associated with the motor. Contrary to the absolute type sensor, an incremental type sensor detects a relative position. When the synchronous motor is to be controlled by using the incremental type sensor, the absolute position of the magnetic pole cannot be determined from the feedback signals. Thus, the magnetic pole position determining means is provided in the dedicated control section. The magnetic pole position determining means makes a flow of a driving current of a predetermined electrical angle in the synchronous motor at the time of starting rotation to move the magnetic pole to a predetermined position. The predetermined position to which the magnetic pole is moved is fixed by a current angle of the supplied driving current. By compulsorily moving the magnetic pole to the predetermined position, the magnetic pole position can be known even if the magnetic pole position has been unknown. Thereby, the magnetic pole position of the synchronous motor can be determined without the use of the absolute position feedback signals.

Thus, after the magnetic pole position is determined preliminarily, the dedicated control section controls the synchronous motor with a one-revolution signal position as a reference position of the magnetic pole. Thereby, the synchronous motor can be controlled without using the absolute position feedback signals.

The servo controller of the present invention can use attribution data for specifying a driven motor connected to the servo controller and selecting a dedicated servo control section and parameters suitable for the specified motor. The attribution data are data for determining types and characteristics of the motor and/or the sensor. The attribution data are stored in a sensor associated with each motor or a numerical control device controlling the servo controller. The attribution data are inputted into the servo controller. The servo controller discriminates the inputted attribution data for specifying a motor connected to the servo controller, and selects a dedicated control section and driving parameters suitable for the specified motor. A motor controller controls the specified motor by using the driving parameter.

The servo controller for performing the above-described processing comprises a common control section for carrying out control common to an induction motor and a synchronous motor which require different control modes, first and second dedicated control sections for respectively carrying out control dedicated to the two types of motors, and a selecting section for selecting a motor to be driven and a dedicated control section in accordance with the selected motor. The common control section has a position controller, a velocity controller and a current controller. The first dedicated control section has a magnetic flux current command generator for calculating a magnetic flux and a magnetic flux current to generate a magnetic flux current command and a slip command generator to generate a slip command for an induction motor. The second dedicated control section has a d-axis current command generator for issuing a d-axis current command for a synchronous motor. The selecting section selects a dedicated control section and driving parameters based on the attribution data of each motor. A combination of the selected dedicated control section, the common control section, and a motor position/velocity detecting section cooperatively constitutes a servo controller for the selected motor.

The second dedicated control section further comprises a magnetic pole position determiner for the synchronous motor. In the case where a sensor associated with the synchronous motor outputs relative position signals, the dedicated control section is informed that the sensor outputs relative position signals as well as the motor type is a synchronous motor based on discrimination of the attribution data. Upon receipt of this information, the second dedicated control section selects the magnetic pole position determiner. The magnetic pole position determiner moves a magnetic pole position to a predetermined position upon receiving an external input signal to perform a preliminary determination of the magnetic pole position. When the preliminary determination is completed, the magnetic pole position determiner issues a magnetic pole determination state signal. After detecting the magnetic pole determination state signal, the second dedicated control section allows driving of the synchronous motor with the preliminarily determined magnetic pole position as a reference magnetic pole position. The synchronous motor is started upon receipt of a velocity command or a position command. After detecting a one-revolution signal preset to be issued at zero degree of the magnetic pole, the magnetic pole position determiner fixes the magnetic pole position with the position where the one-revolution signal is detected as the reference position of 0 degree.

The selecting section may comprise a selecting switch for connecting one motor to be driven selected form a plurality of motors in response to an external switching signal. In the present invention, the plurality of types of motors requiring different control modes are not limited to the synchronous motor and the induction motor and can be any types of motors. Also, the number and combination of motors to be controlled may be arbitrary.

DETAILED DESCRIPTION OF THE PREFERRED EMBODIMENTS

Figure 1:
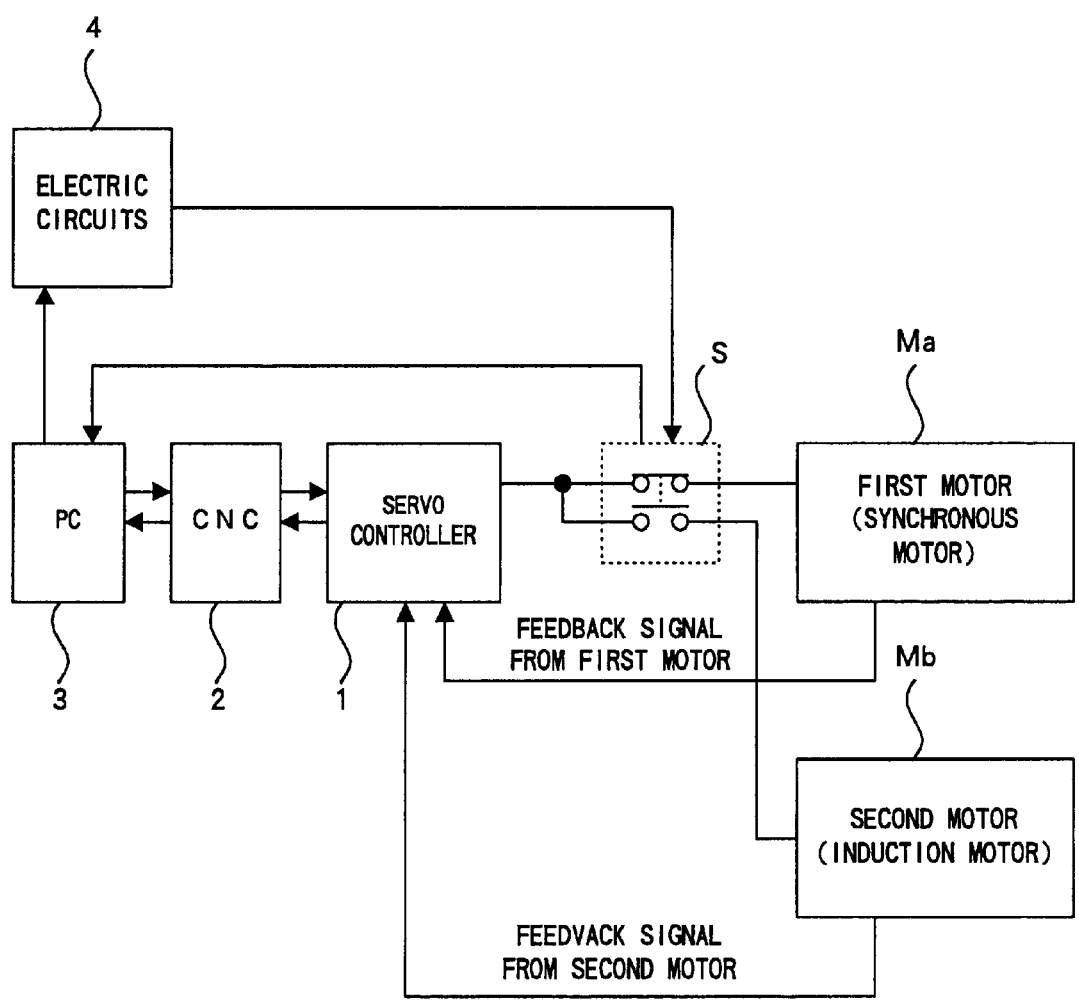
FIG. 1 is a schematic block diagram showing an arrangement of a servo controller according to the present invention.

FIG. 1 is a block diagram showing an arrangement of a servo controller in accordance with the present invention. FIG. 1 shows an example in which two motors of a synchronous motor and an induction motor are used. However, the number of motors to be selectively connected to the servo controller is not limited to two, and any plural number of motors can be used.

In FIG. 1, a CNC 2 controls a servo controller 1 for driving a plurality of motors Ma and Mb with a different control mode, and also controls an electric circuits 4 via a PC 3, thereby carrying out control for a machine tool or a robot. This figure shows an example in which a first motor (synchronous motor) Ma and a second motor (induction motor) Mb are used under a different control mode. A power line for supplying a driving current from the servo controller 1 to the first motor Ma and the second motor Mb is selected and switched by selecting means S, whereby either one of the first motor Ma and the second motor Mb is driven.

The servo controller 1 contains a common control section for carrying out control common to a plurality of types of motors with a different control mode, a dedicated control section for carrying out control dedicated to each of the plurality of types of motors, and a selecting section for selecting a driven motor and the dedicated control section in accordance with the driven motor.

Next, an example of arrangement of the servo controller 1 will be explained with reference to FIGS. 2 to 4. In the example shown in the figures, the synchronous motor Ma and the induction motor Mb are controlled by one type of servo controller, and incremental feedback signals are used.

Figure 2:
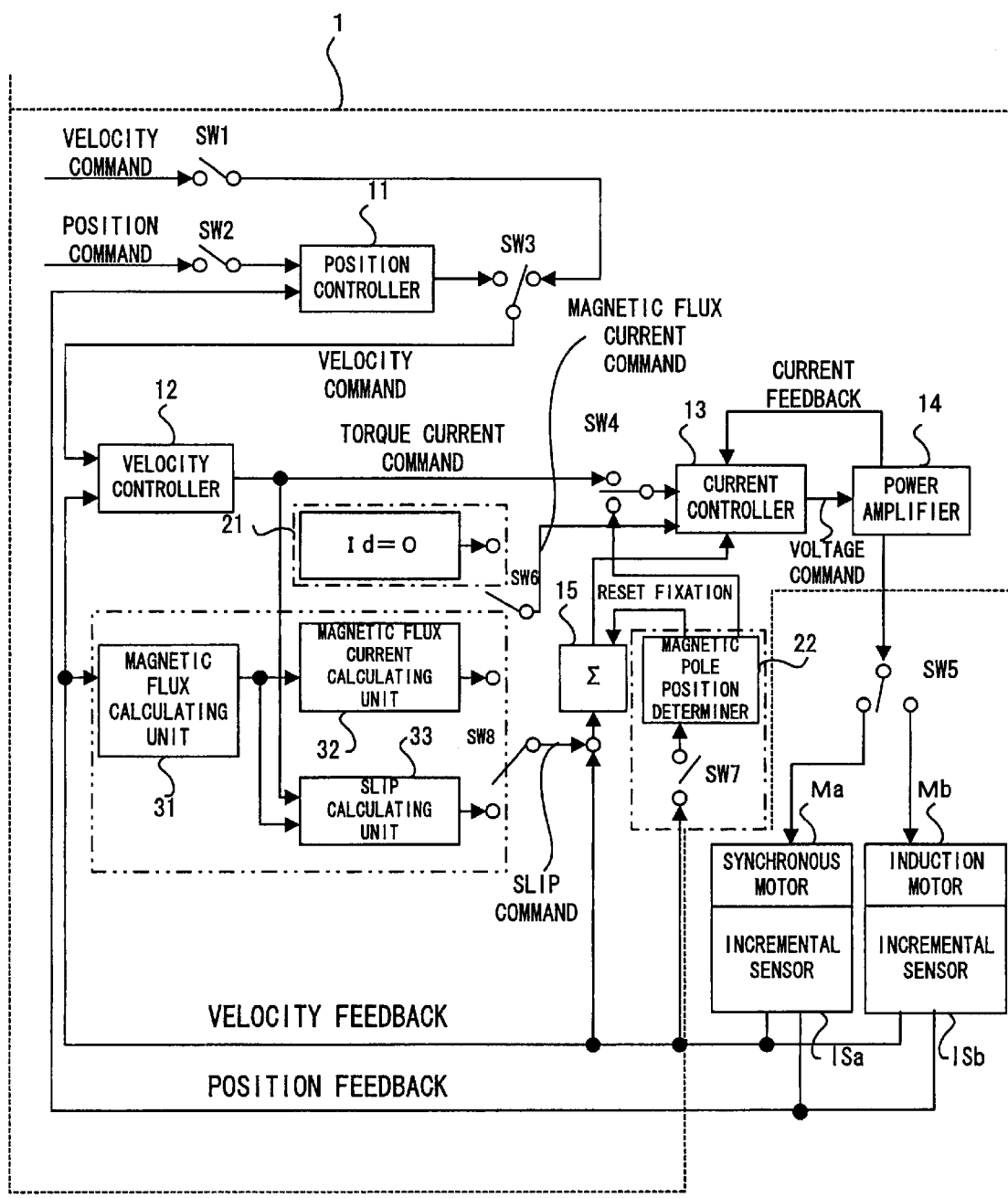
FIG. 2 is a detailed block diagram for showing the servo controller according to the present invention.
Figure 3:
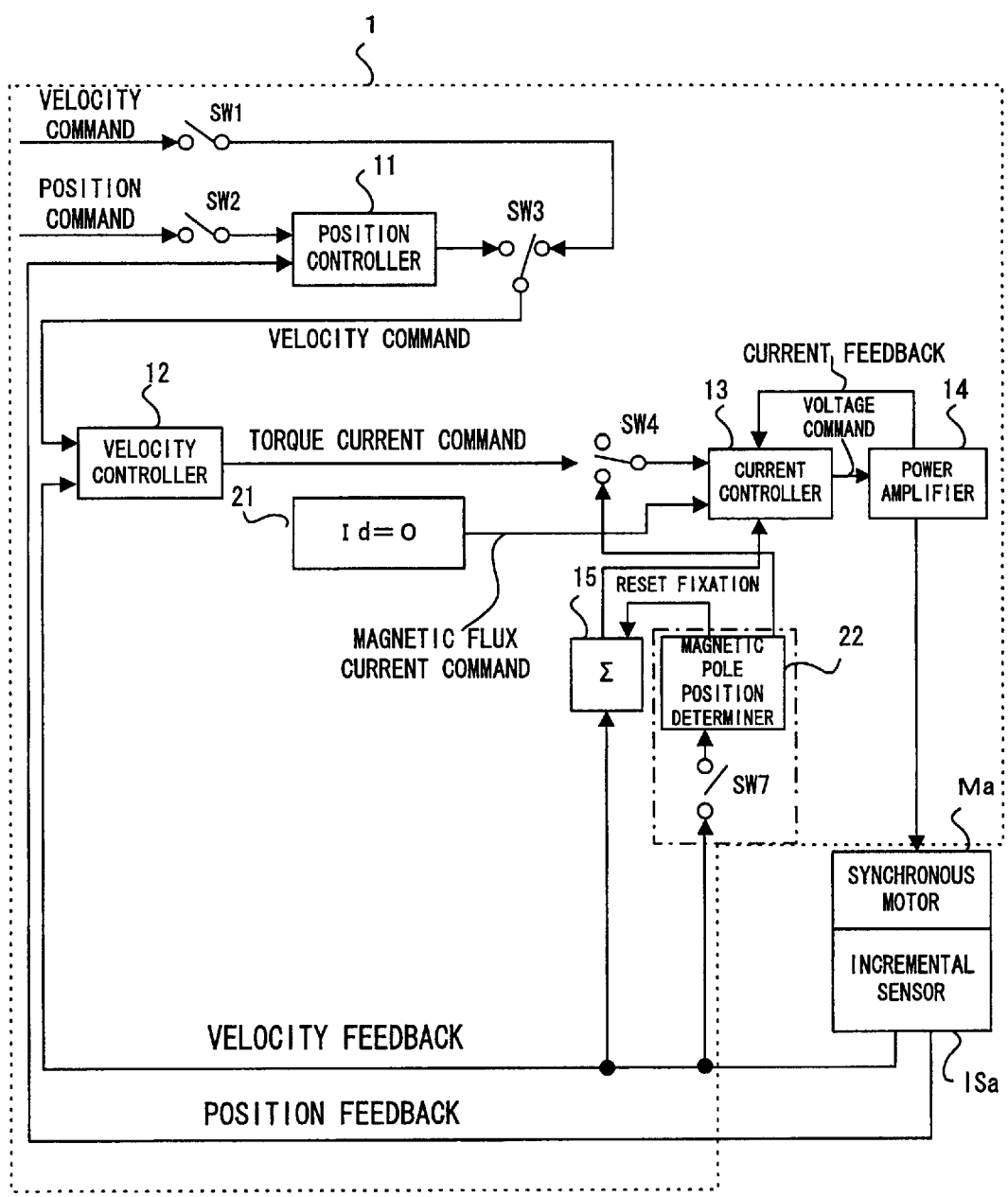
FIG. 3 is a detailed block diagram showing an arrangement in a case where a synchronous motor is controlled by the servo controller according to the present invention.
Figure 4:
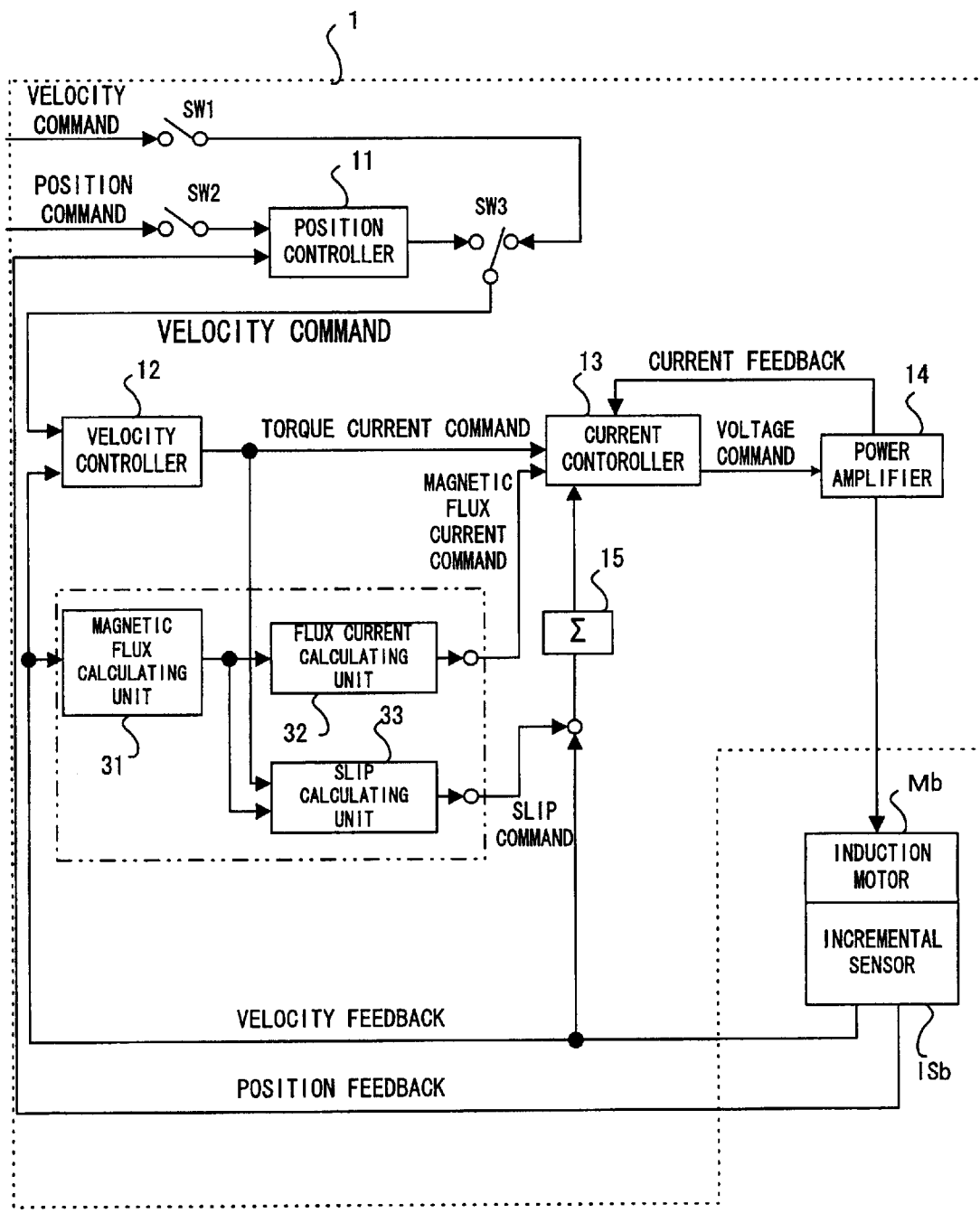
FIG. 4 is a detailed block diagram showing an arrangement in a case where an induction motor is controlled by the servo controller according to the present invention.

FIG. 3 shows a case where the selecting section selects control of the synchronous motor and FIG. 4 shows a case where the selecting section selects control of the induction motor in FIG. 2. In FIGS. 3 and 4, the dedicated control section that is not selected is omitted.

In FIG. 2, the servo controller 1 enclosed by the broken line contains the dedicated control section (portions enclosed by the alternate long and short dash lines and the alternate long and two short dashes line), the common control section (portion enclosed by the broken line excluding the portions enclosed by the alternate long and short dash lines and the alternate long and two short dashes line), and the selecting section (change-over switches SW1 to SW8 in the figure) for selecting the driving motor and the dedicated control section.

The CNC (computerized numerical control device) 2 is formed so as to incorporate a computer, and the servo controller 1 can be formed by a digital servo circuit having a processor (CPU), ROM, RAM, and so on. The CNC and the servo controller 1 can be connected to each other via a communication cable.

The synchronous motor Ma and the induction motor Mb are provided with an incremental sensor ISa and an incremental sensor Isb, which generate a relative position signal, respectively.

The common control section, which is a control section common to the control of synchronous motor and the control of induction motor, comprises a position controller 11, a velocity controller 12, a current controller 13, a power amplifier 14, and an adder 15.

The processor of the servo controller reads a position command (or velocity command) given by the CNC 2 via the communication cable (not shown), and performs position loop processing, velocity loop processing, and current loop processing.

The position controller 11 is supplied with the position command from the CNC 2 via the change-over switch SW2, and also supplied with position feedback signals from the incremental sensor ISa or the incremental sensor ISb. The position controller 11 determines a position difference by subtracting the position feedback value from the position command, and carries out position loop control by multiplying the position difference by a position gain to issue a velocity command.

The velocity controller 12 is supplied with the velocity command and a velocity feedback value, determines a velocity difference by subtracting the velocity feedback value from the velocity command, and performs velocity loop processing such as proportional control, integral control, etc. to issue a torque command (current command). For the velocity command, a mode in which the velocity command is supplied from the CNC 2 via the change-over switch SW1 and the change-over switch SW3 and a mode in which the velocity command given by the position controller 11 is supplied can be selected by the change-over switches SW1, SW2 and SW3.

The current controller 13 is supplied with a torque current command from the velocity controller 12, a current feedback value from the power amplifier 14, and a d-axis current command, and also is supplied with an addition value of slip command from the adder 15 in the case of the induction motor. The current controller 13 performs current loop processing by subtracting the current feedback value from the current command to determine a voltage command for each phase, and thereby supplies a driving current by switching to the synchronous motor Ma or the induction motor Mb by the change-over switch SW5. The power amplifier 14 can be formed by using a transistor inverter or the like.

In FIG. 2, the dedicated control section enclosed by the alternate long and short dash lines, which is a control section dedicated to the synchronous motor Ma, comprises a d-axis current generating section 21 and a pole position fixation processing section 22.

The d-axis current generating section 21 generates a d-axis current of Id=0, and supplies it to the current controller 13 via the change-over switch SW6.

The pole position fixation processing section 22 carries out control for fixing a magnetic pole position of the synchronous motor Ma by the use of a relative position signal detected by the incremental sensor ISa. The magnetic pole position is temporarily fixed by causing a driving current of a predetermined electrical angle to flow via the change-over switch SW4 and by moving the magnetic pole to a predetermined position. The predetermined position to which the magnetic pole is moved is determined by the current angle of the supplied driving current. By compulsorily moving the magnetic pole to the predetermined position, the magnetic pole position can be made known even if the magnetic pole position is unknown.

After the magnetic pole position is fixed temporarily, the pole position fixation processing section 22 controls the synchronous motor with a one-revolution signal position of the relative position signal detected by the incremental sensor ISa being the reference position.

Also, in FIG. 2, the dedicated control section enclosed by the alternate long and two short dashes line, which is a control section dedicated to the induction motor Mb, comprises a magnetic flux calculating unit 31, a d-axis current calculating unit 32, and a slip calculating unit 33.

The magnetic flux calculating unit 31 is supplied with the velocity feedback value, and calculates a magnetic flux command. The d-axis current calculating unit 32 is supplied with the magnetic flux command, and calculates the magnetic flux current Id. The magnetic flux current Id is supplied to the current controller 13 via the change-over switch SW6. The slip calculating unit 33 is supplied with the magnetic flux command and the torque current command, and calculates a slip command. The slip command is added by the adder 15 via the change-over switch SW8, and is supplied to the current controller 13.

The dedicated control sections provided in the servo controller 1 can be selected according to the motor to be driven by switching the change-over switches SW.

FIG. 3 shows an arrangement in a case where the synchronous motor Ma is driven in the arrangement shown in FIG. 2. In FIG. 3, the change-over switch SW5 shown in FIG. 2 is switched to the side of the synchronous motor Ma, the change-over switch SW6 is switched to the side of the flux current generating section 21, and the pole position fixation processing section 22 is selected by the change-over switch SW7. In FIG. 3, the arrangement dedicated to the induction motor Mb is omitted.

FIG. 4 shows an arrangement in a case where the induction motor Mb is driven in the arrangement shown in FIG. 2. In FIG. 4, the change-over switch SW5 shown in FIG. 2 is switched to the side of the induction motor Mb, the change-over switch SW6 is switched to the side of the d-axis current calculating unit 32, the change-over switch SW8 is switched to the side of the slip calculating unit 33, and the pole position fixation processing section 22 is separated by the change-over switch SW7. In FIG. 4, the arrangement dedicated to the synchronous motor Ma is omitted.

Although the control of the synchronous motor Ma and the induction motor Mb can be carried out by the ordinary control mode, the embodiment in accordance with the present invention differs from the ordinary control in that the control is carried out by the use of the relative position signal detected by the incremental sensor ISa in the control of the synchronous motor Ma. In the following description, therefore, the operation of the pole position fixation processing section 22 is explained using a flowchart of FIG. 5 in the control of the synchronous motor Ma, and the ordinary control of the synchronous motor Ma and the control of the induction motor Mb are omitted.

Figure 5:
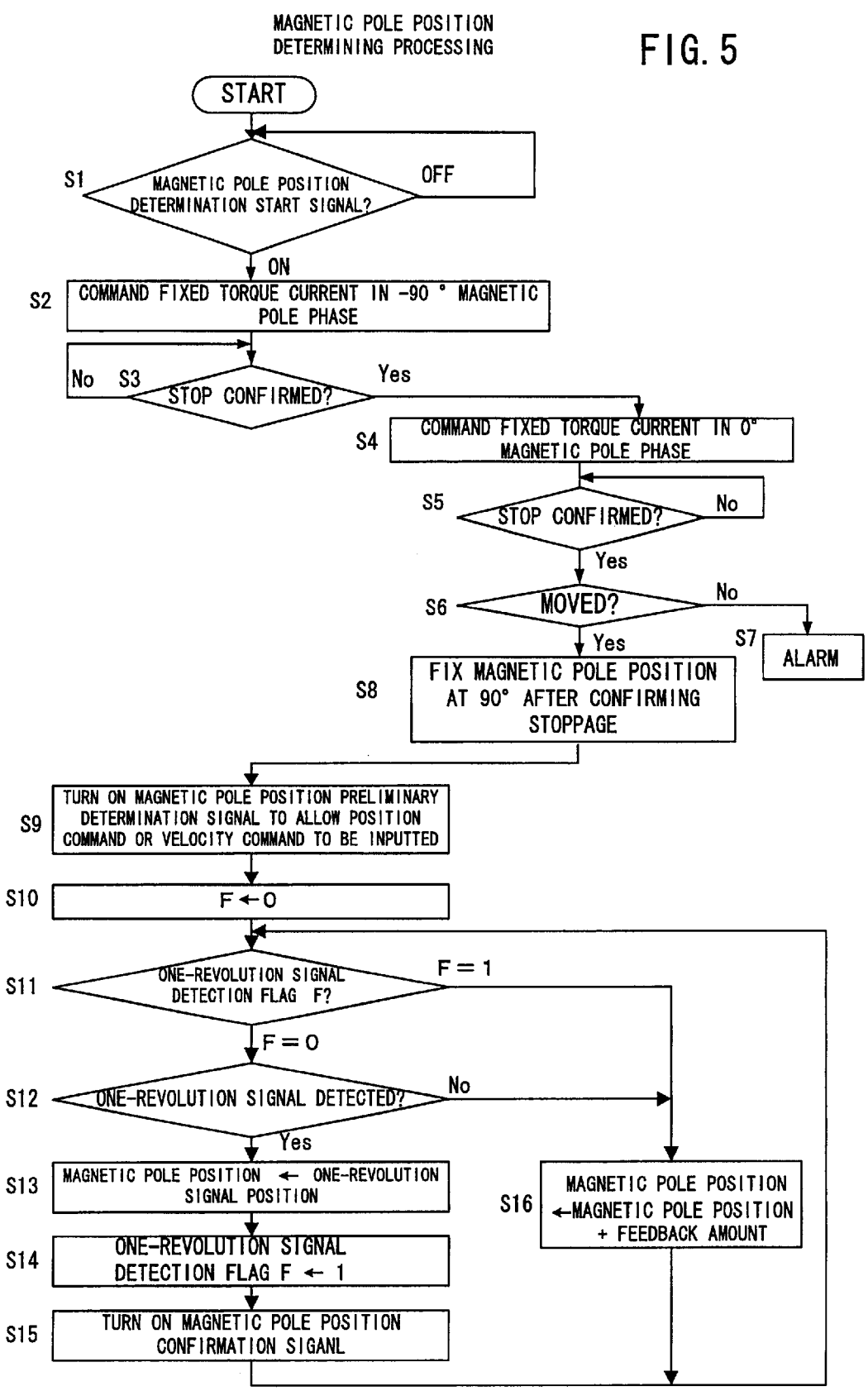
FIG. 5 is a flowchart for showing an operation of a magnetic pole position determiner in a case where a synchronous motor is controlled by the servo controller according to the present invention.

In the flowchart shown in FIG. 5, the pole position fixation processing section 22 temporarily fixes the magnetic pole position of the synchronous motor in Steps S1 to S8. After the preliminary fixation, in Steps S9 to S15, the synchronous motor is started with the temporarily fixed position being made the magnetic pole position, the one-revolution signal position of the relative position signal detected by the incremental sensor ISa is made the magnetic pole position, and the position command or the velocity command is supplied to carry out control.

First, when the incremental sensor ISa is installed to the synchronous motor Ma, alignment is performed so that the one-revolution signal position of the incremental sensor ISa is in agreement with the magnetic pole reference position in advance. Thereafter, after a pole position fixation start signal requiring the operation for fixing the magnetic pole position is supplied from the outside, the following pole position fixation processing is started.

This pole position fixation start signal can prevent malfunction when the power is turned on with the magnetic pole position being unfixed by the processing requiring an operation performed by an operator (Step S1).

The magnetic pole position is unfixed until the one-revolution signal position is detected. If the synchronous motor is driven in this state, a predetermined torque cannot sometimes be obtained, so that the synchronous motor cannot be driven. Therefore, the change-over switch SW7 is turned on, and the change-over switch SW4 is switched to the side of the pole position fixation processing section 22, whereby the supply of the torque current command from the velocity controller 12 is stopped, and a fixed torque current is commanded. Thereupon, the pole position fixation processing section 22 temporarily fixes the magnetic pole position in Steps S2 to S8.

In the preliminary fixation of magnetic pole position, the electrical angle of the magnetic pole position is made −90 degrees, and the torque current for the −90 degree phase is commanded (Step S2).

If the magnetic pole position is shifted from 0 degree, the synchronous motor Ma is started by commanding the torque current corresponding to the 90 degree phase, and is stopped at a position where the electrical angle of the magnetic pole position is 0 degree (Step S3).

On the other hand, if the magnetic pole is located at a position of 0 degree, the synchronous motor Ma is still stopped even if the torque current for the −90 degree phase is commanded, so that the torque current for 0-degree phase is commanded (Step S4). Even if the magnetic pole is at a position where the synchronous motor Ma does not rotate in Step S2, the synchronous motor Ma is started by performing processing in Step S4, and is stopped at a position where the electrical angle of the magnetic pole position is 90 degrees (Step S5). Then, after the stopping is checked, and the rotation of the synchronous motor Ma in Steps S3 to S5 is checked (Step S6), the magnetic pole position where the synchronous motor Ma is stopped is fixed as 90 degrees (Step S8).

If the synchronous motor Ma is not started by either of the torque current command for the −90 degree phase and the torque current command for the 0-degree phase, there is a possibility of some trouble occurring. Therefore, if the synchronous motor Ma is not started by the torque current command of either phase, processing for giving an alarm is performed (Step S7).

After the magnetic pole position is temporarily fixed at 90 degrees in Step S8, the synchronous motor Ma is started, and control is carried out by supplying the position command or the velocity command in Steps S9 to S16.

After the preliminary fixing operation is finished in Step S8, a pole position preliminary fixing operation completion signal is turned on, and the change-over switches SW1, Sw2 and SW3 are switched to make the position command or the velocity command capable of being supplied. Also, the change-over switch SW4 is switched from the pole position fixation processing 22 to the side of the current controller 13. Thereby, the synchronous motor Ma is controlled by the position command or the velocity command.

After a flag F representing the detection state of one-revolution signal is set at 0 representing an undetected state (Step S10), the detection of one-revolution signal is monitored (Step S11).

The one-revolution signal is a signal generated each time the incremental sensor ISa rotates one turn. Since the position of the one-revolution signal has been aligned with the magnetic pole reference position in advance, the magnetic pole reference position can be detected by the detection of one-revolution signal.

When the one-revolution signal is detected with the flag F being 0 (Step S12), the position of one-revolution signal is made the magnetic pole reference position (Step S13), and subsequently control is carried out based on the magnetic pole reference position. Also, the flag F is set at 1 (Step S14), and a pole position confirmation signal is turned on, whereby the completion of fixation is notified to the outside (Step S15).

After the flag F is set at 1, the flag F is judged to be 1 in Step S11, and the magnetic pole position after rotation is determined by adding a feedback amount to the magnetic pole position (Step S16). The control is continued by using the determined magnetic pole position.

If the one-revolution signal is undetected with the flag F being 0 in Step S12, the control is carried out based on the temporary pole position by the processing in Step S16.

The servo controller of the present invention can perform selection of a dedicated control section suitable for a motor to be driven by using the attribution data. The selection using the attribution data will be explained using two examples of arrangement. In a first arrangement example, the servo controller is designed to be connected to one motor. In a second arrangement example, the servo controller is designed to be selectively connected to one of a plurality of motors.

Figure 6:
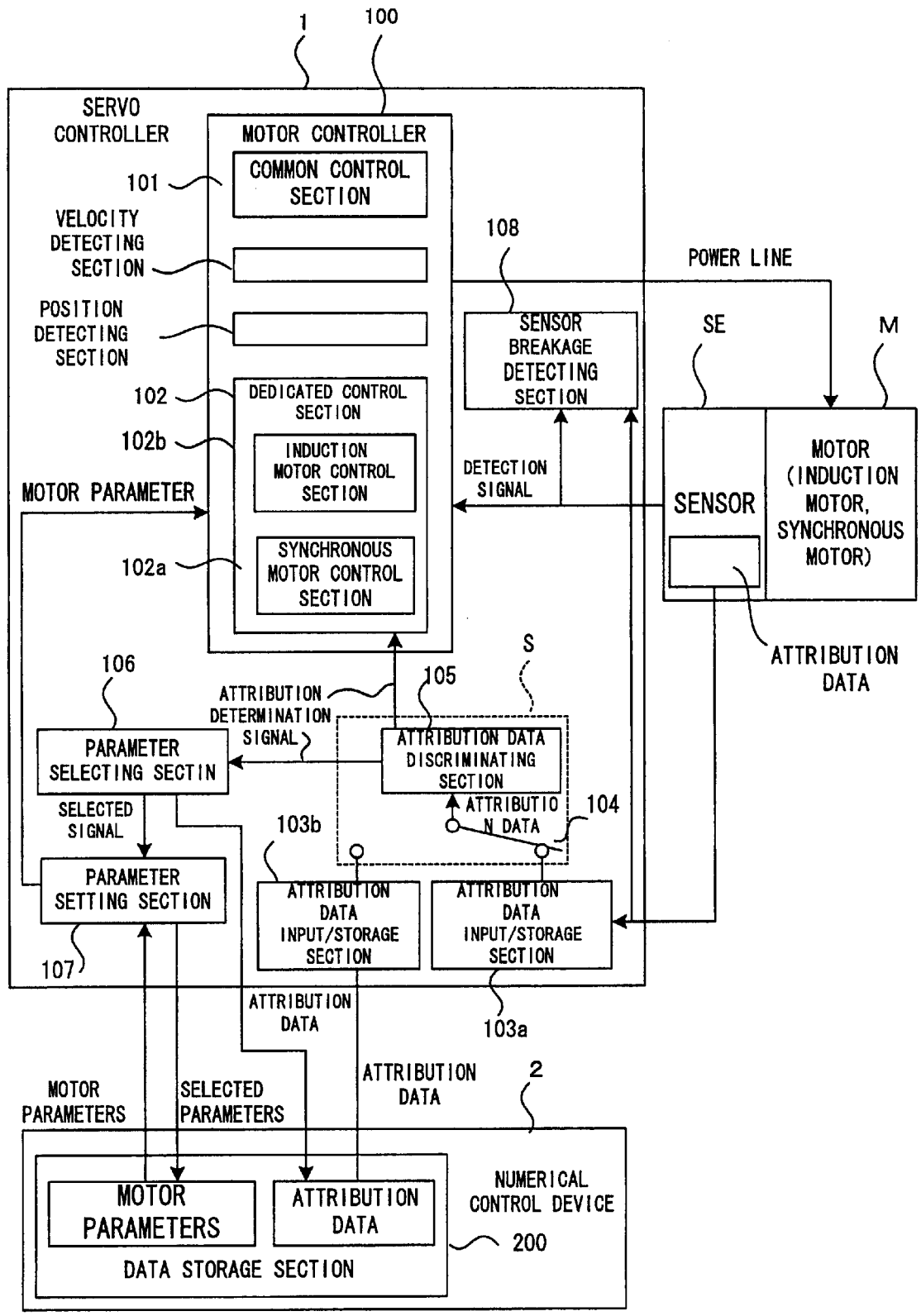
FIG. 6 is a block diagram for showing an arrangement of a servo controller in which a motor to be driven and its associated sensor are specified based on attribution data.
Figure 7:
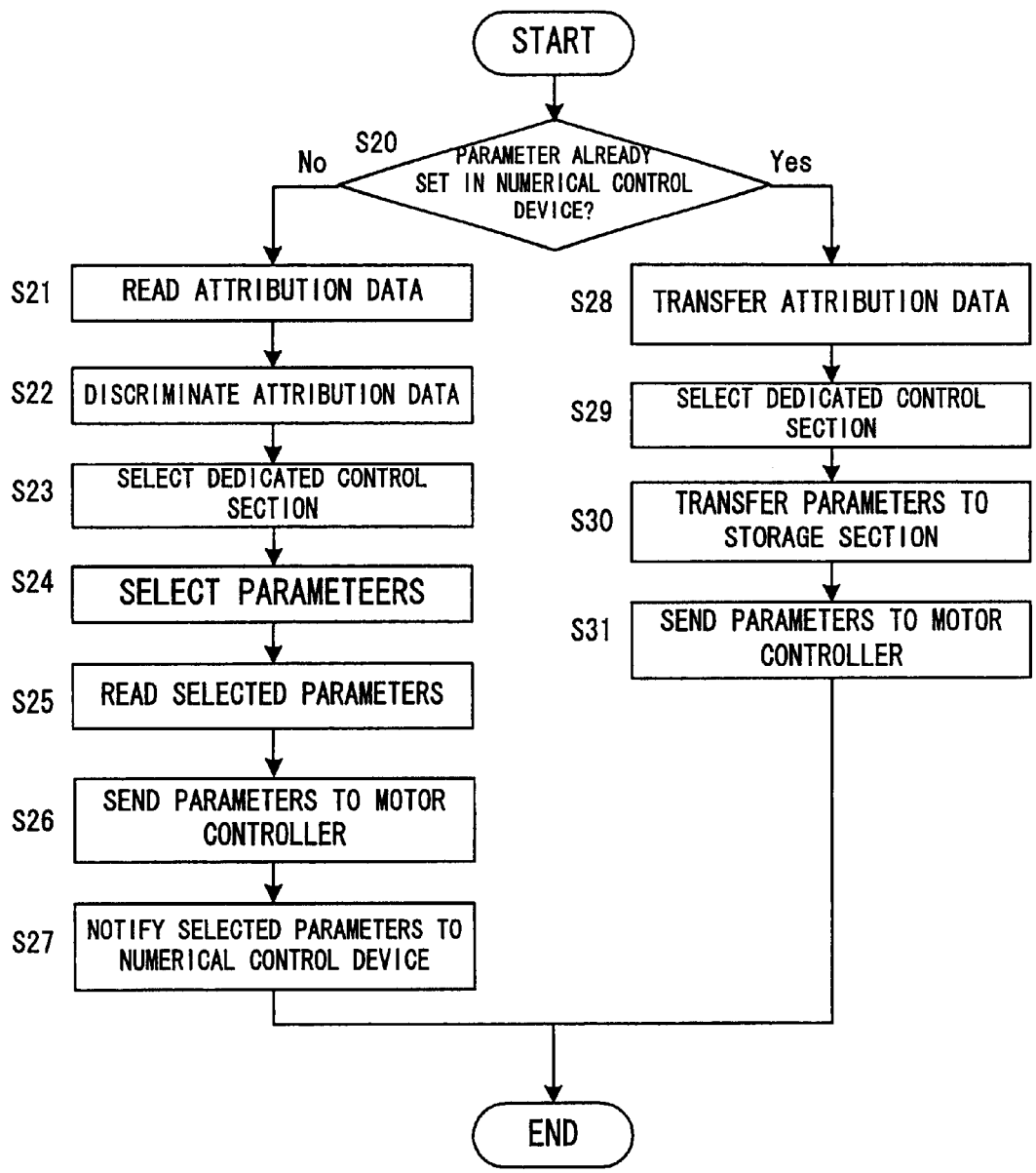
FIG. 7 is flowchart showing processes to be executed by the servo controller as shown in FIG. 6.

FIGS. 6 and 7 show the first arrangement example. In the first example, a servo controller 1 controls one motor by using a motor controller 100. A motor M may be an induction motor or a synchronous motor to be controlled in a different control mode, or a motor to be controlled in the same control mode but having different characteristics.

The motor controller 100 comprises a common control section 101 for any kind of motor and a dedicated control section 102 dedicated to a specific kind of motor, and a velocity detecting section and a position detecting portion. The dedicated control section 102 has a synchronous motor control section 102a and an induction motor control section 102b.

The motor M is associated with a sensor SE. The sensor SE has two functions. The first function is to feed back sensed feed-back signals to the motor controller 100. The second function is to store the attribution data of the motor M. The attribution data represent the types and characteristics of the motor M and the sensor SE.

The servo controller 1 receives the sensed signals in the motor controller 100 and performs detection of the position and velocity of the motor, and receives the attribution data in an attribution data input/storage section 103a when the motor is connected to the servo controller.

An attribution data discriminating section 105 discriminates the types and characteristics of the connected motor M and the sensor SE from contents of the attribution data inputted in the attribution data input/storage section 103a. The attribution data discriminating section 105 sends an attribution determination signal to the dedicated control section 102 and a parameter selecting section 106. The dedicated control section 102 selects a control section suitable for the motor M based on the attribution determination signal. The parameter selecting section 106 selects motor parameters suitable for the motor M based on the attribution determination signal, and sends the selected signal to a parameter setting section 107. The parameter setting section 107 sets motor parameters suitable for the motor M based on the selected signal, and sends them to the motor controller 100. The motor controller 100 drives the motor M by using the motor parameters.

Therefore, the servo controller 1 makes two selections, i.e., selection of a control section suitable for the motor M and selection of motor parameters.

A numerical control device 2 can hold attribution data and a motor parameter in a data storage section 200. The servo controller 1 receives the attribution data from the numerical control device 2 into the attribution data input/storage section 103b, and handles it in the same way as the attribution data provided in the sensor SE. A change-over switch 104 performs switching between the attribution data input/storage sections 103a and 103b to connect either one of the two to the attribution data discriminating section 105. The attribution data input/storage sections 103 and the attribution data discriminating section 105, which are enclosed by the broken line in FIG. 6, constitute selecting means S.

The servo controller 1 can be configured so as to have one attribution data input/storage section 103.

The servo controller 1 can take the motor parameter from the data storage section 200 of the numerical control device 2 into the parameter setting section 107 in place of the selection made by parameter selecting section 106.

The servo controller 1 is provided with a sensor breakage detecting section 108. The sensor breakage detecting section 108 is a device for detecting the connection state between the sensor SE and the servo controller 1. The sensor breakage detecting section 108 monitors the detection signal and/or the attribution data generated by the sensor SE, and judges whether a connected state is established or a broken state is established between the sensor SE and the servo controller 1.

The operation of the first arrangement example will be explained with reference to a flowchart shown in FIG. 7.

If no motor parameter is set in the numerical control device 2 (Step S20), the attribution data input/storage section 103a reads attribution data from the sensor SE (Step S21). The attribution data discriminating section 105 takes in the attribution data from the attribution data input/storage section 103a. The attribution data discriminating section 105 discriminates the types and characteristics of the motor M and sensor SE, and sends an attribution determination signal to the dedicated control section 102 and the parameter selecting section 106 (Step S22).

The dedicated control section 102 selects a control section suitable for the motor M based on the attribution determination signal (Step S23). The parameter selecting section 106 selects a motor parameter based on the attribution determination signal, and sends the selected signal to the parameter setting section 107 (Step S24).

The parameter setting section 107 reads the selected motor parameter based on the selected signal, and sets it. An arrangement is possible in which a plurality of motor parameters are stored in advance in the parameter selecting section 106, and the selected motor parameter is transferred to the parameter setting section 107 (Step S25).

The parameter setting section 107 sends the set motor parameter to the motor controller 100. The motor controller 100 carries out motor control based on the motor parameter (Step S26).

The parameter selecting section 106 and the parameter setting section 107 send the selected parameters and the attribution data to the numerical control device 2. Thereupon, the numerical control device 2 can perform initial settings and conformation on the types of the motor M and sensor SE and the contents of the set motor parameters (Step S27).

On the other hand, in a case where motor parameters are set in the numerical control device 2 (Step S20), the numerical control device 2 transfers the attribution data stored in the data storage section 200 to the attribution data input/storage section 103b (Step S28). The dedicated control section 102 selects a control section suitable for the motor M based on the attribution data (Step S29). The numerical control device 2 transfers the motor parameter to the parameter setting section 107 (Step S30). The parameter setting section 107 sends the motor parameter to the motor controller 100. The motor controller 100 carries out motor control based on the motor parameters (Step S31).

Figure 8:
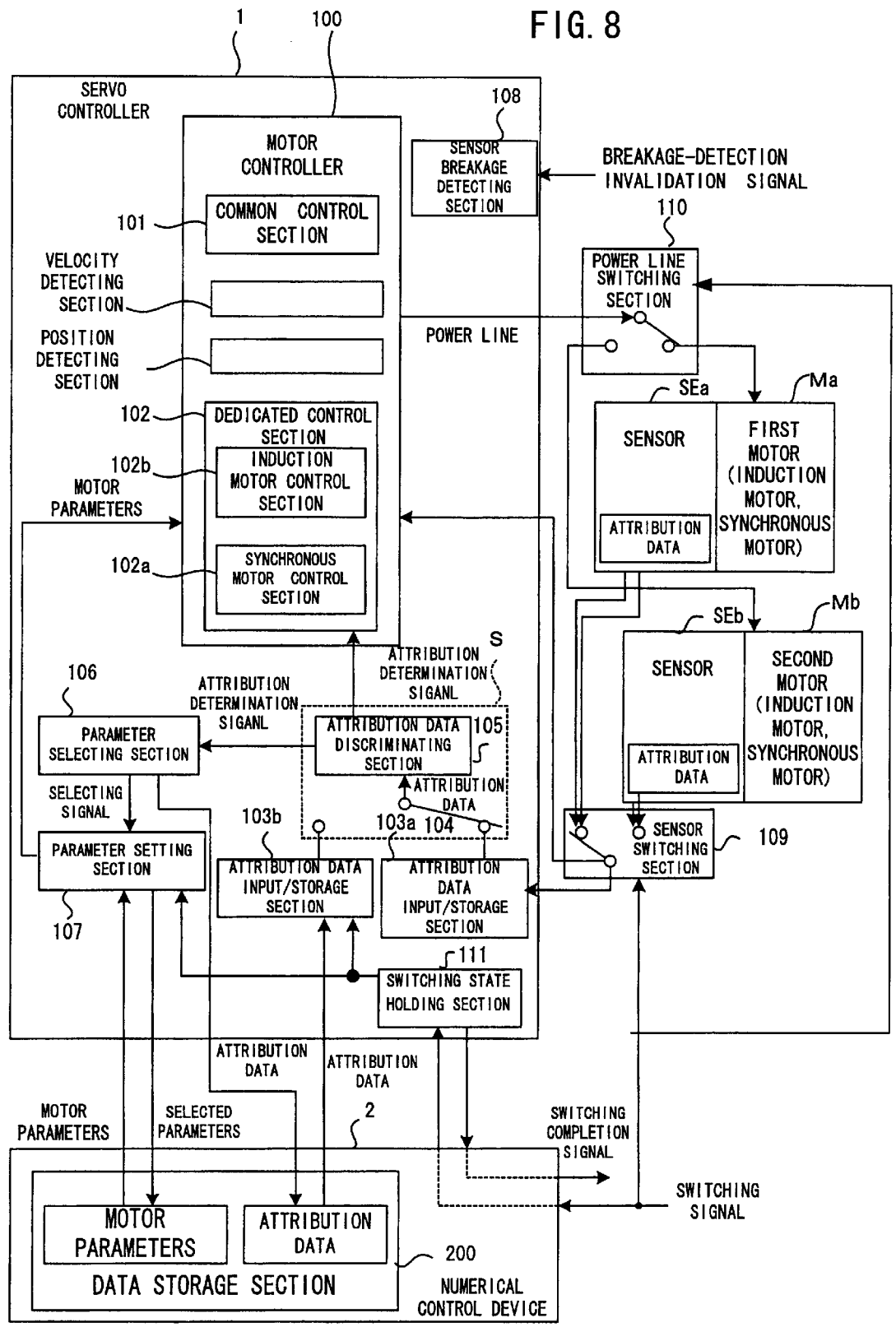
FIG. 8 is a block diagram for showing an arrangement of a servo controller in which two motors are selectively used, and a motor to be driven and its associated sensor are specified based on attribution data.
Figure 9:
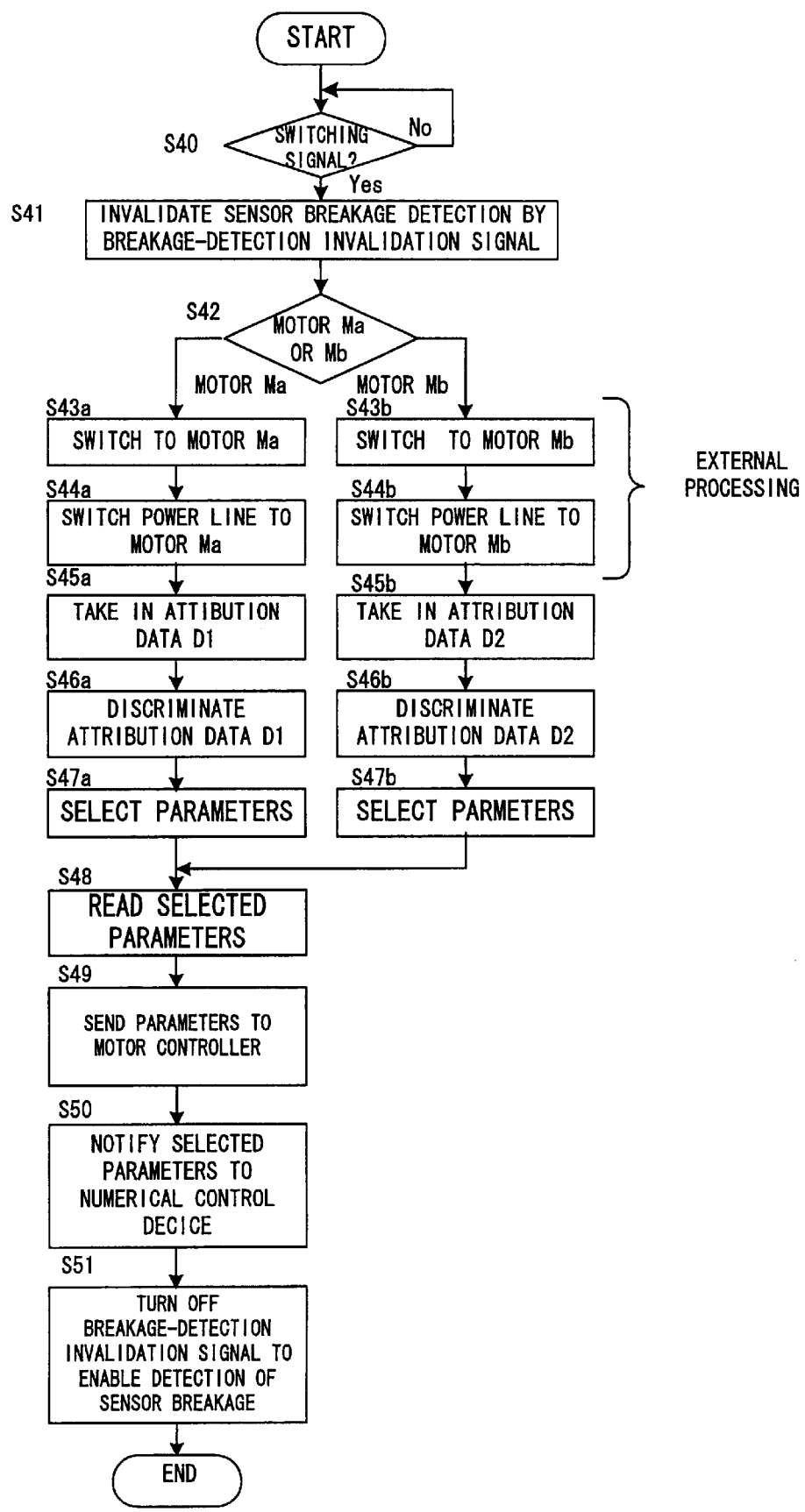
FIG. 9 is a flowchart showing processes to be executed by the servo controller as shown in FIG. 8, in the case where the attribution data are inputted from the sensor associated with the motor.
Figure 10:
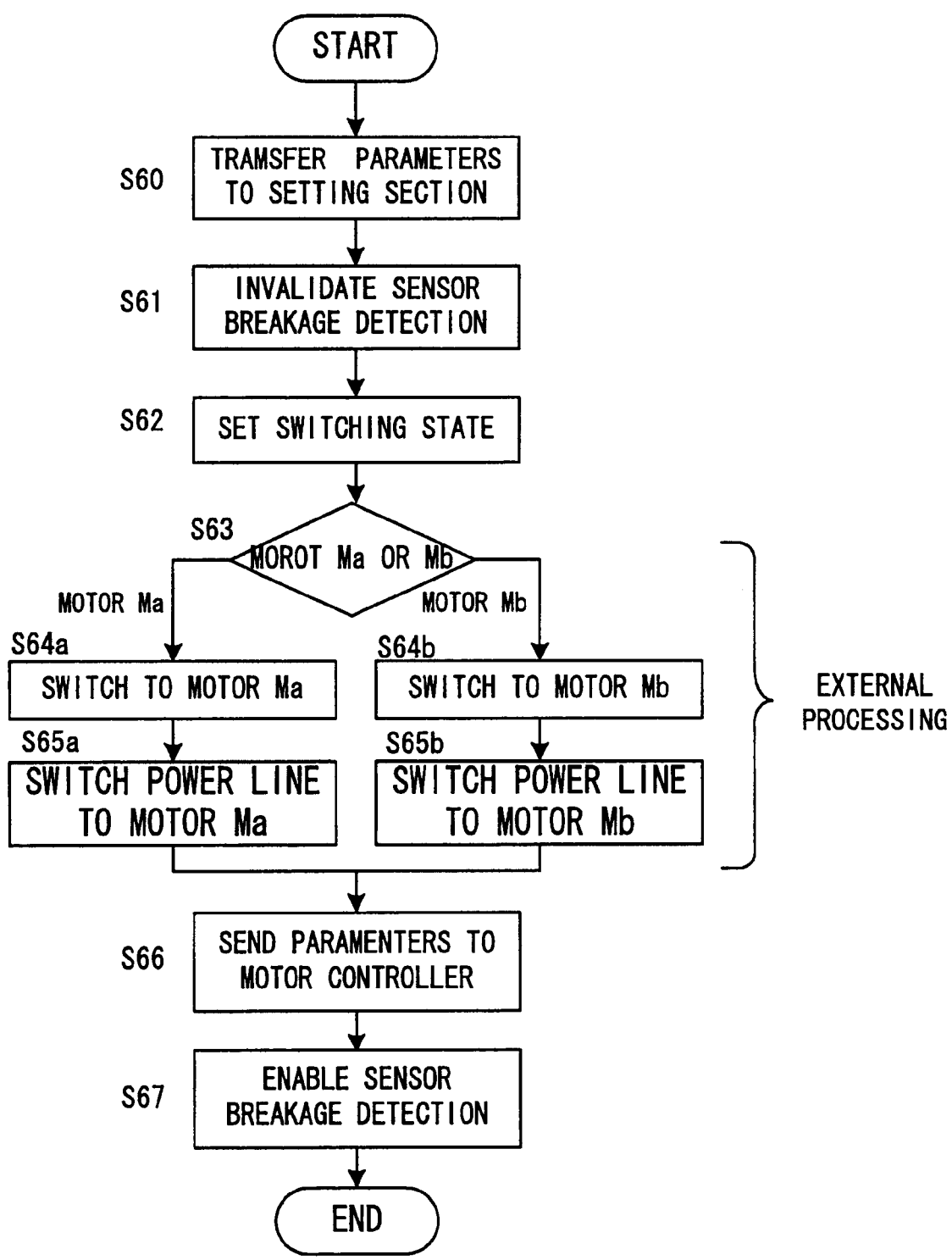
FIG. 10 is a flowchart showing processes to be executed by the servo controller as shown in FIG. 8, in the case where the attribution data are inputted from a numerical control device.
Figure 11:
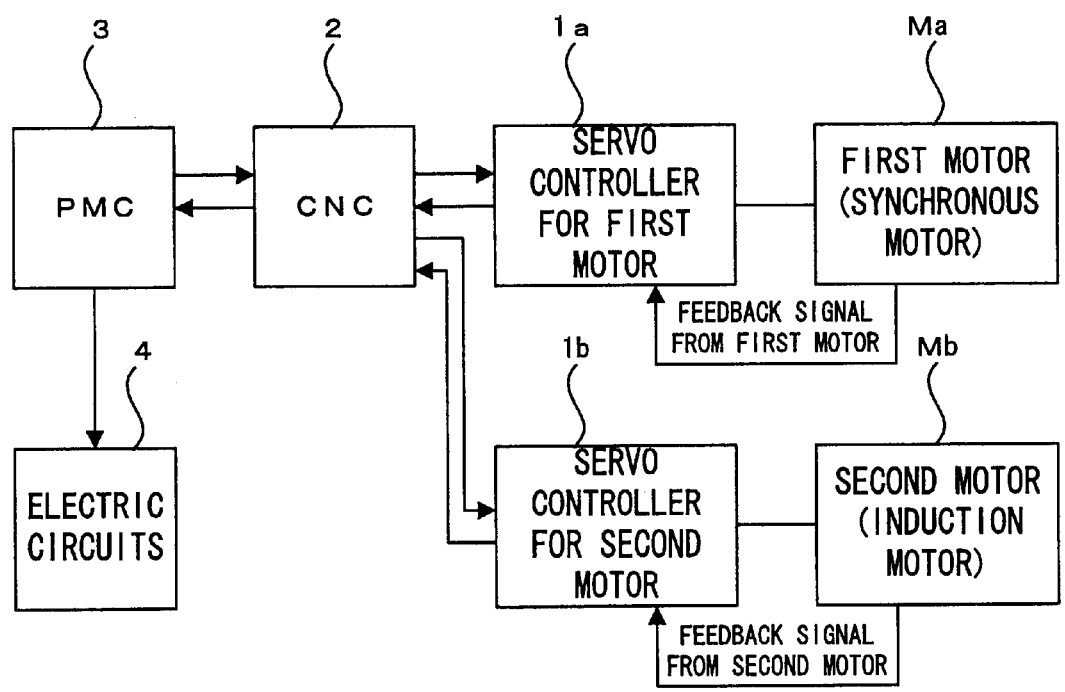
FIG. 11 is a block diagram showing a conventional arrangement in which a plurality of motors to be driven in different control modes are controlled by individual servo controllers.

FIGS. 8–10 show the second arrangement example. In the second example, the servo controller 1 selectively controls two motors, i.e., a first motor Ma and a second motor Mb not simultaneously by using the motor controller 100. The motor Ma and the motor Mb may be an induction motor or a synchronous motor to be driven in a different control mode, or may be a motor to be driven in the same control mode but having different characteristics.

The motor Ma and the motor Mb are provided with a sensor SEa and a sensor SEb, respectively, as in the first arrangement example. Each of the sensor SEa and the sensor SEb stores attribution data representing the type and characteristics of the motor and the sensor itself.

In the second example, a switching state holding section 111, a sensor switching section 109, and a power line switching section 110 are provided in addition to the arrangement elements shown in the first arrangement example.

The sensor switching section 109 switches the attribution data and detection signal from each sensor SE in switching the motor. By this switching operation, the servo controller 1 can be supplied with the attribution data and detection signal of the objective motor.

The power line switching section 110 switches a power line supplying driving power to each motor in switching the motor. By this switching operation, the servo controller 1 can supply driving power to the objective motor.

The switching state holding section 111 receives a switching signal from an external device through the numerical control device 2, and holds the switching signal. The switching signal is for selecting a motor to be driven by the servo controller 1 selected from the plurality of motors, and for performing switching operation.

The external switching signal performs switching operation of the power line switching section 110 and the sensor switching section 109. When the switching signal is inputted through the numerical control device 2, the switching state holding section 111 issues a switching command to the attribution data input/storage section 103 to read the attribution data of the objective motor and the sensor. Also, the switching state holding section 111 switches the motor parameter set in the parameter setting section 107 to the motor parameter of the objective motor.

The sensor breakage detecting section 108 invalidates a function of detecting a sensor breakage upon input of a breakage-detection invalidation signal to prevent an erroneous detection of breakage in changing over of the sensors. After finishing the above processes, the servo controller 1 issues a switching completion signal to an external device through numerical control device 2 and the external device turns off the breakage-detection invalidation signal to validate the function of detecting a sensor breakage upon receipt of switching completion signal.

The power line switching section 110 switches the power line to the driven motor upon receipt of the switching signal and supplies power to only the objective motor.

The operation of the second arrangement example will be explained with reference to flowcharts shown in FIGS. 9 and 10. The flowchart shown in FIG. 9 shows a case where no motor parameter is set in the numerical control device, and the flowchart shown in FIG. 10 shows a case where a motor parameter is set in the numerical control device.

When no motor parameter is set in the numerical control device, the driven motor is selected after waiting the supply of the switching signal (Step S40).

A case where switching operation is performed between two motors of the motor Ma and the motor Mb will be explained below as an example.

The switching state holding section 111 discriminates from the switching signal which motor of the first motor Ma or the second motor Mb is driven. A case where the motor Ma is driven will be explained below. Steps S43b to S47b for the motor Mb are the same as Steps S43a to S47a for the motor Ma.

The sensor breakage detecting section 108 invalidates the function of detecting sensor breakage on receipt of the breakage-detection invalidation signal (Step S41). The switching state holding section 111 sends a switching command to the attribution data input/storage section 103. The sensor switching section 109 switches to the sensor section side of the motor Ma on receipt of the switching signal (Step S43a). The power line switching section 110 switches the power line to the motor Ma side on receipt of the switching signal (Step S44a).

The attribution data discriminating section 105 takes in the attribution data Dl of the motor Ma from the attribution data input/storage section 103 (Step S45a), and discriminates the attribution data Dl (Step S46a). The parameter selecting section 106 selects the motor parameter of the motor Ma based on the attribution determination signal, and sends the selected signal to the parameter setting section 107 (Step S47a).

The parameter setting section 107 reads the selected motor parameters based on the selected signal, and sets them. An arrangement is possible in which the motor parameters of the motor Ma and the motor Mb are stored in advance in the parameter selecting section 106, and the selected motor parameter is transferred to the parameter setting section 107 (Step S48).

The parameter setting section 107 sends the set motor parameters to the motor controller 100. The motor controller 100 carries out motor control based on the motor parameters (Step S49).

The parameter selecting section 106 and the parameter setting section 107 send the selected parameters and the attribution data to the numerical control device 2. Thereupon, the numerical control device 2 can perform an initial setting and confirmation on the types of the motor and the sensor, and the contents of the set motor parameters (Step S50).

The servo controller 1 issues a switching completion signal to the external device through the numerical control device 2. In response to the switching completion signal, the external device turns off the breakage-detection invalidation signal to enable the detection of sensor breakage (Step S51).

On the other hand, if a motor parameter is set in the numerical control device 2, the numerical control device 2 transfers the attribution data to the attribution data input/ storage section 103b, and transfers the motor parameter to the parameter setting section 107 (Step S60), and invalidate the function of the sensor breakage detecting section 108 upon receipt of the breakage-detection invalidation signal (Step S61). Also, the numerical control device 2 sends a switching signal to the switching state holding section 111 to set the switched state (Step S62).

A case where switching operation is performed between two motors of the motor Ma and the motor Mb will be explained below as an example.

The switching state holding section 111 determines from the switching signal which motor of the motor Ma or the motor Mb is driven. A case where the motor Ma is driven will be explained below. Steps S64b to S65b for the motor Mb are the same as Steps S64a to S65a for the motor Ma.

The sensor switching section 109 switches to the sensor side of the motor Ma on receipt of the switching signal (Step S64a). The power line switching section 110 switches the power line to the motor Ma side on receipt of the switching signal (Step S65a).

The parameter storage section 107 sends the set motor parameters to the motor controller 100 (Step S66). After completing the switching, the servo controller issues switching completion signal to the external device through the numerical control device and the external device turns off the breakage-detection invalidation signal to enable the detection of sensor breakage (Step S67).

By the above-described arrangement, a controller suitable for a motor driven based on the attribution data can be constituted. Since the selection of the dedicated control section can be made automatically by using the attribution data, the operator can perform operation while being unaware of the type of motor connected to the servo controller. Also, the adjustment time for setting work and startup can be shortened.

Control can be carried out by one servo controller for the combination of various motors, such as induction motors, synchronous motors, and an induction motor and a synchronous motor.

The induction motor suitable for high-velocity rotation and high power and the synchronous motor suitable for high accuracy and high efficiency can be controlled by one servo controller by switching between them. For example, when the present invention is applied to a table axis of a vertical type lathe, servo controllers conventionally provided exclusively to each motor can be reduced to one servo controller, so that an effect of decreasing the installation area for the servo controller and an effect of reducing the cost can be achieved.

On a machine using both of the induction motor and the synchronous motor, two types of servo controllers are conventionally needed for maintenance management. According to the present invention, only one type of servo controller is needed, so that the maintenance management is made easy.

Also, in terms of manufacture of servo controllers, there is no need for manufacturing two types of special-purpose servo controllers, i.e., the servo controller designed specially for the induction motor and the servo controller designed specially for the synchronous motor, so that an effect of lowering the manufacturing cost can be achieved.

According to the embodiment of the present invention, by using a servo controller independent of the type of motor, the synchronous motor and the induction motor can be driven by a servo controller of one type.

Also, the driving by a servo controller of one type offers advantages in terms of maintenance management, cost, and installation area of servo controller.

Further, the use of an incremental detector such as a gear type sensor as a detector enhances the reliability at the time of high-velocity rotation, and facilitates the application of a through type that is easy in cooling.

As described above, according to the present invention, motors to be driven with different control modes, such as a synchronous motor and an induction motor, can be controlled by a servo controller of one type irrespectively of the type of motor. Also, servo control can be carried out by the use of incremental feedback signals.

What is claimed is:

1. A servo controller comprising:
   a common control section for performing control common to an induction motor and an synchronous motor, said common control section including a position controller, a velocity controller and a current controller;
   a first dedicated control section for performing control dedicated to the induction motor, and a second dedicated control section for performing control dedicated to the synchronous motor, said first dedicated control section including a d-axis current command generator for calculating magnetic flux and magnetic flux current, and a slip command generator to generate a slip command for the induction motor, said second dedicated control section including a d-axis current command generator to set a d-axis current command for the synchronous motor;
   a position/velocity detecting section for detecting position/velocity of a motor to be driven based on signals from a sensor associated with the motor; and
   a selecting section for selecting one of said first dedicated control section and said second dedicated control section, and driving parameter for the motor to be driven, based on attribution data preset for each motor, thereby controlling the motor to be driven by a combination of said common control section, the selected dedicated control section and said position/velocity detecting section.

2. A servo controller according to claim 1, wherein said attribution data for each motor include data indicating kind and characteristic of each motor and/or the associated sensor, and are stored in the associated sensor and inputted into the servo controller from the associated sensor.

3. A servo controller according to claim 1, wherein said attribution data preset for each motor include data indicating kind and characteristic of each motor and/or each associated sensor, and are stored in a numerical controller and inputted into the servo controller from the numerical controller.

4. A servo controller according to claim 2 or 3, wherein a sensor for outputting incremental position signals is associated with each of the synchronous motor and the induction motor, said second dedicated control section comprises a magnetic-pole position determiner, and when it is discriminated based on the attribution data that the motor to be controlled is the synchronous motor, said magnetic-pole position determiner moves the magnetic pole of the synchronous motor to a predetermined position according to an external input signal for preliminary determination of the magnetic pole, outputs a magnetic-pole determined state signal at the predetermined position to enable driving of the motor with the preliminary determination position as a reference magnetic pole position, starts driving of the motor in response to a velocity command or a position command and continues the driving after detection of an one-revolution signal preset at a zero degree position of the motor, with a position where the one-revolution signal is detected as the reference position of zero-degree, using a sensor-signal input circuit common to the induction motor and the synchronous motor.

5. A servo controller according to any one of claim 1, wherein said selecting section further comprises a selecting switch for connecting one motor selected to be driven from a plurality of motors with the servo controller based on an external switching signal.

6. A servo controller according to claim 5, wherein said attribution data for each motor includes data indicating kind and characteristic of each motor and/or the associated sensor, and are stored in the associated sensor and inputted into the servo controller from the associated sensor.

7. A servo controller according to claim 5, said attribution data preset for each motor including data indicating kind and characteristic of each motor and/or each associated sensor, and are stored in a numerical controller and inputted into the servo controller from the numerical controller.

8. A servo controller according to claim 6 or 7, wherein a sensor for outputting incremental position signals is associated with each of the synchronous motor and the induction motor, said second dedicated control section comprises a magnetic-pole position determiner, and when it is discriminated based on the attribution data that the motor to be controlled is the synchronous motor, said magnetic-pole position determiner moves the magnetic pole of the synchronous motor to a predetermined position according to an external input signal for preliminary determination of the magnetic pole, outputs a magnetic-pole determined state signal at the predetermined position to enable driving of the motor with the preliminary determination position as a reference magnetic pole position, starts driving of the motor in response to a velocity command or a position command and continues the driving after detection of an one-revolution signal preset at a zero degree position of the motor, with a position where the one-revolution signal is detected as the reference position of zero-degree, using a sensor-signal input circuit common to the induction motor and the synchronous motor.

* * * * *

UNITED STATES PATENT AND TRADEMARK OFFICE
CERTIFICATE OF CORRECTION

PATENT NO. : 6,252,367 B1
DATED : June 26, 2001
INVENTOR(S) : Keiji Sakamoto et al.

Page 1 of 1

It is certified that error appears in the above-identified patent and that said Letters Patent is hereby corrected as shown below:

<u>Title page,</u>
Item [75], change "Kumamoto" to -- Kikuchi --.

Item [56], FOREIGN PATENT DOCUMENTS insert -- A -- after each reference number.

Item [57], ABSTRACT
Line 12, change "th" to -- the --

<u>Column 4,</u>
Line 52, "In" begins a new paragraph.

<u>Column 7,</u>
Line 10, "The" begins a new paragraph.

Signed and Sealed this

Fifteenth Day of January, 2002

*Attest:*

JAMES E. ROGAN
*Attesting Officer*  *Director of the United States Patent and Trademark Office*